3,318,885
SUBSTITUTED 6-AMINO-6,14-ENDOETHEN-
OCODIDES AND MORPHIDES
John J. Brown, Pearl River, N.Y., Robert Allis Hardy, Jr., Ridgewood, N.J., and Carol Therese Nora, Spring Valley, N.Y., assignors to American Cyanamid Company, Stamford, Conn., a corporation of Maine
No Drawing. Filed Dec. 3, 1965, Ser. No. 511,344
10 Claims. (Cl. 260—247.5)

This application is a continuation-in-part of our copending application Ser. No. 473,830, filed July 21, 1965, now abandoned.

This invention relates to novel substituted 6-amino-6,14-endoethenocodides and morphides and to novel methods of preparing these compounds. More particularly, the novel 7-substituted-7,8-dihydro-6-amino-6,14 - endoethenocodides and morphides of the present invention may be represented by the following general formula:

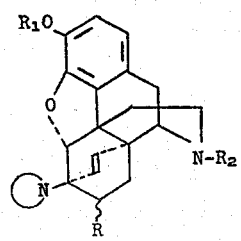

wherein $R_1$ is hydrogen, lower alkyl or lower alkanoyl; $R_2$ is hydrogen, cyano, propargyl, lower alkyl, lower aralkyl, lower alkenyl or lower cycloalkylmethyl; R is cyano, formyl, carbamyl, mono(lower alkyl)carbamyl, di(lower alkyl)carbamyl, lower alkanoyl, lower cycloalkanoyl, benzoyl, lower carboalkoxy or carbo(phenyl lower alkyl)oxy; and ⟩N— is pyrrolidinyl, piperidino, morpholino or di(lower alkyl)amino. Suitable lower alkyl, lower alkanoyl, and lower carboalkoxy groups contemplated by the present invention are those having up to about 4 carbon atoms in the alkyl moieties. Suitable lower alkenyl groups contemplated by the present invention are those having up to about 6 carbon atoms such as, for example, allyl, methallyl, dimethallyl, etc. Suitable lower cycloalkylmethyl groups contemplated by the present invention are those having from 4 to 7 carbon atoms such as, for example, cyclopropylmethyl, cyclobutylmethyl, cyclopentylmethyl, etc. Lower cycloalkanoyl groups contemplated by the present invention are those having from about 4 to about 7 carbon atoms such as, for example, cyclopentylcarbonyl, cyclohexylcarbonyl, etc. Lower aralkyl is exemplified by benzyl, β-phenylethyl, and the like. Carbo(phenyl lower alkyl)oxy is exemplified by carbobenzyloxy, carbophenethyloxy, and the like.

The novel compounds of the present invention are obtainable as crystalline materials having characteristic melting points and absorption spectra. They are appreciably soluble in many organic solvents such as ethanol, chloroform, benzene, ethyl acetate, and the like. They are, however, generally insoluble in water.

The organic bases of this invention form non-toxic acid-addition salts with a variety of organic and inorganic salt-forming agents. Thus, acid-addition salts, formed by admixture of the organic free base with an acid, suitably in a neutral solvent, are formed with such acids as sulfuric, phosphoric, hydrochloric, hydrobromic, citric, lactic, tartaric, acetic, gluconic, ascorbic, and the like. Also included within the purview of the present invention are the alkali metal salts (e.g., sodium and potassium) of the organic free bases when $R_1$ in the above general formula is hydrogen. For purposes of this invention, the organic free bases are equivalent to their non-toxic acid-addition salts and their alkali metal salts.

The novel compounds of the present invention may be readily prepared from an appropriately substituted codeinone or morphinone in accordance with the following reaction scheme:

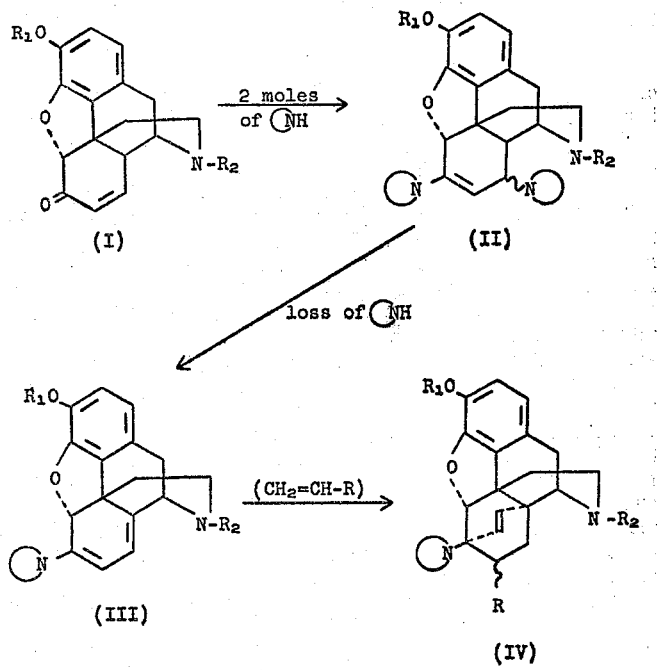

wherein $R_1$, $R_2$, R and ⟩N— are as hereinabove defined. In accordance with this reaction scheme, treatment of an appropriately substituted codeinone or morphinone (I) with a secondary amine ⟩NH furnishes the 6,8-bis-amino intermediates (II), which optionally may be isolated and purified or used without purification. These 6,8-bis-amino derivatives (II) are then converted to the dienamines (III), whose isolation is also optional, which are further allowed to react with dienophiles (CH$_2$=CH—R) producing the novel 6-amino-6,14-endoethenocodides and morphides of this invention.

The conversion of the substituted codeinone or morphinone derivatives (I) to the intermediate 6,8-bis-(tertiary amino) derivatives (II) may be conveniently carried out in an inert solvent, such as methanol, ethanol, isopropanol, n-butanol, etc., at a temperature of from about 25° C. to about 150° C. However, the refluxing temperature of the solvent, such as methanol or ethanol, is the preferred temperature in order to insure a substantially complete reaction. The conversion of the 6,8-bis-(tertiary amino) derivatives (II) to the dienamines (III) is best carried out by heating the intermediates (II) in an inert solvent such as benzene, toluene, and the like at a temperature of from about 80° C. to about 150° C. until the reaction is substantially complete (usually one to several hours). The dienamine product is promptly separated from the reaction mixture by standard methods well known in the art.

Addition of the dienophile (CH$_2$=CH—R) to the dienamine (III) proceeds readily whereby there is obtained the corresponding 7 - substituted - 7,8-dihydro-6-amino-6,14-endoethenocodide or morphide (IV). This conversion is conveniently carried out in an organic solvent such as benzene or in an excess of the dienophile reagent as the solvent. This reaction may be carried out at a temperature of from about 50° C. to about 150° C. However, the refluxing temperature of the solvent is the preferred temperature in order to insure a substantially complete reaction which usually requires from about 1 to about 24 hours to go to completion. The corresponding 7 - substituted-7,8-dihydro-6-amino-6,14-endoethenocodide or morphide (IV) thus obtained is readily isolated from the reaction mixture and may be purified by recrystallization from solvents such as ethanol, acetone and the like.

In addition to the above described general scheme for the preparation of the novel compounds of the present invention, they may also be obtained by transformations of the 7-substituent (R; Structure IV). For example, 7-carboalkoxy derivatives may be transformed to 7-carbamyl derivatives by treatment with amines, and 7-cyano derivatives may be transformed to 7-alkanoyl derivatives by treatment with alkyl Grignard reagents using procedures well known to those skilled in the art.

The novel compounds of the present invention are active analgesics when measured by a modification of the rat tail-flick method described by F. E. D'Amour and D. L. Smith [J. Pharmacol. Exptl. Therap., vol. 72, p. 74 (1941)]. The compounds (generally as hydrochloride salts in 0.9% saline) are administered subcutaneously to groups of 5 rats. Graded doses are given to several groups of rats. These rats are then individually subjected to the heat stimulus from a spot light lamp and a condensing lens focused on the blackened tip of the rat tail. The characteristic response to this presumably painful heat stimulus is to flick the tail out of the concentrated beam of the heat source. The response time (in seconds) is measured for control and treated groups, and the criterion of analgesia is an approximately 100% increase in response time over controls. Established clinically active analgesics such as meperidine, codeine, morphine, etc., are active in the above test. When tested by this procedure, 7-cyano-7,8-dihydro-6-(1-pyrrolidinyl)-6,14-endoethenocodide shows analgesic activity approximately equivalent to morphine.

When mixed with suitable excipients or diluents, the compounds of this invention can be prepared as pills, capsules, tablets, powders, solutions, suspensions and the like for unit dosage, and to simplify administration. As analgesics they will relieve pain by direct action on the nerve centers or by diminishing the conductivity of the sensory nerve fibers. The novel compounds of the present invention may also be administered in combination therapy with salicylates such as aspirin and the like.

The novel compounds of this invention may exist in several isomeric forms such as stereoisomers. It is to be understood that the present invention includes within its scope all such isomeric forms. For example, the codeinones and morphinones, used as starting materials, have several asymmetric carbon atoms, and addition of the dienophile (CH$_2$=CH—R) forms a new asymmetric center (at C-7). Formation of stereoisomers, or epimers, at C-7 is sometimes evident in the isolation and purification of the novel products of this invention. The nuclear magnetic resonance spectra of the 7-substituted-7,8-dihydro-6-amino-6,14-endoethenocodides and morphides of this invention are particularly helpful in characterizing mixtures of epimers or the substantially pure stereoisomers as obtained from the reaction mixture or from subsequent purification and separation. Selective crystallization and chromatographic techniques are useful for the separation of these epimeric mixtures. All such stereoisomeric forms of the 7-substituted-7,8-dihydro-6-amino-6,14-endoethenocodides and morphides are, therefore, included within the purview of the present invention.

The invention will be described in greater detail in conjunction with the following specific examples.

EXAMPLE 1

*Preparation of 6,8-bis-(1-pyrrolidinyl)-$\Delta^6$-codide methanolate*

Pyrrolidine (4 ml.) is added slowly with stirring to a suspension of codeinone (4 g.) in hot methanol (40 ml.) under nitrogen. The reaction mixture is then allowed to cool to room temperature during which time the product crystallizes. The mixture is then kept at 0–5° C. for 1–2 hours. The crystalline product is collected, washed with methanol, and air-dried to give 6,8-bis-(1-pyrrolidinyl)-$\Delta^6$-codide methanolate (3.57 g.), M.P. 112–114° C. dec. A freshly prepared sample shows infrared absorption at 6.15 microns (in chloroform solution), and the nuclear magnetic resonance spectrum shows the pattern characteristic for one olefinic proton (at C-7).

*Analysis.*—Calcd. for $C_{27}H_{39}N_3O_3$: C, 71.49; H, 8.67; N, 9.26. Found: C, 71.38; H, 8.81; N, 9.25.

EXAMPLE 2

*Preparation of 6-demethoxy-6-(1-pyrrolidinyl)thebaine*

A solution of 6,8-bis-(1-pyrrolidinyl)-$\Delta^6$-codide methanolate (245 mg.) in anhydrous benzene (25 ml.) is heated under reflux for four hours. Solvent is removed, giving an oil which is crystallized by trituration with ether. Collection with n-hexane affords product (112 mg.), M.P. 117–120° C. which is recrystallized from n-hexane giving 6-demethoxy-6-(1-pyrrolidinyl)thebaine having M.P. 121–123° C., infrared absorption at 6.38$\mu$, and ultraviolet absorption at $\lambda_{max.}$ 338 m$\mu$, $\epsilon$=9650. The nuclear magnetic resonance spectrum supports the structure and shows specifically two olefinic protons (at C-7 and C-8).

*Analysis.*—Calcd. for $C_{22}H_{26}N_2O_2$: C, 75.40; H, 7.48; N, 7.99. Found: C, 75.79; H, 7.59; N, 7.92.

EXAMPLE 3

*Preparation of 6-demethoxy-6-(1-pyrrolidinyl)thebaine*

Pyrrolidine (1 ml.) is added slowly with stirring to a suspension of codeinone (1 g.) in hot methanol (10 ml.) under nitrogen. The reaction mixture is allowed to stand for about one hour, and the solvent is evaporated. The resulting residue is then heated under reflux in benzene for four hours. Solvent is removed giving an oil which is crystallized by trituration with ether. Collection with n-hexane gives 6-demethoxy-6-(1-pyrrolidinyl)thebaine.

EXAMPLE 4

*Preparation of 6-demethoxy-6-morpholinothebaine*

A mixture of codeinone (200 mg.), morpholine (1 ml.) and methanol (10 ml.) is heated in an autoclave at a temperature of from 100° C. to 105° C. for 18 hours. Evaporation of solvent gives an oil. This oil is heated under reflux in benzene (10 ml.) for four hours, and solvent is removed giving 6-demethoxy-6-morpholinothebaine as an oil with infrared absorption at 6.33μ. The nuclear magnetic resonance spectrum of this oil supports the structure and shows olefinic protons at C–7 and C–8.

EXAMPLE 5

*Preparation of 6-demethoxy-6-morpholinothebaine*

A solution of codeinone (500 mg.), morpholine (1.5 ml.), and n-butanol (25 ml.) is heated under reflux for 16 hours. Evaporation of solvent gives an oil. This oil is heated under reflux in benzene for four hours, and solvent is removed giving 6-demethoxy-6-morpholinothebaine.

EXAMPLE 6

*Preparation of 6-demethoxy-6-(1-pyrrolidinyl)oripavine*

The general procedure of Example 3 is repeated. By treatment of morphinone with an excess of pyrrolidine, followed by heating in benzene, 6-demethoxy-6-(1-pyrrolidinyl)oripavine is thereby obtained.

EXAMPLE 7

*Preparation of N-cyano-6-demethoxy-6-(1-pyrrolidinyl)northebaine*

By following the procedure of Example 3 except that an equivalent amount of N-cyanonorcodeinone is used in place of the codeinone of that example, there is obtained N-cyano-6-demethoxy-6-(1-pyrrolidinyl)northebaine.

EXAMPLE 8

*Preparation of N-allyl-6-demethoxy-6-(1-pyrrolidinyl)northebaine*

The general procedure of Example 3 is repeated. By treatment of N-allylnorcodeinone with an excess of pyrrolidine, followed by heating in benzene, N-allyl-6-demethoxy-6-(1-pyrrolidinyl)northebaine is thereby obtained.

EXAMPLE 9

*Preparation of N-cyclopropylmethyl-6-demethoxy-6-(1-pyrrolidinyl)northebaine*

The general procedure of Example 3 is repeated. By treatment of N-cyclopropylmethylnorcodeinone with an excess of pyrrolidine, followed by heating in benzene, N-cyclopropylmethyl - 6 - demethoxy - 6 - (1 - pyrrolidinyl) northebaine is thereby obtained.

EXAMPLE 10

*Preparation of N-cyclopropylmethyl-6-demethoxy-6-(1-pyrrolidinyl)nororipavine*

The general procedure of Example 3 is repeated. By treatment of N-cyclopropylmethylnormorphinone with an excess of pyrrolidine, followed by heating in benzene, N-cyclopropylmethyl - 6 - demethoxy - 6 - (1 - pyrrolidinyl) nororipavine is thereby obtained.

EXAMPLE 11

*Preparation of 3-acetyl-N-cyclopropylmethyl-6-demethoxy-6-(1-pyrrolidinyl)nororipavine*

The general procedure of Example 3 is repeated. By treatment of 3-acetyl-N-cyclopropylmethylnormorphinone with an excess of pyrrolidine, followed by heating in benzene, 3-acetyl-N-cyclopropylmethyl-6-demethoxy-6-(1-pyrrolidinyl)nororipavine is thereby obtained.

EXAMPLE 12

*Preparation of N-phenethyl-6-demethoxy-6-(1-pyrrolidinyl)northebaine*

The general procedure of Example 3 is repeated. By treatment of N-phenethylnorcodeinone with an excess of pyrrolidine, followed by heating in benzene, N-phenethyl-6-demethoxy-6-(1-pyrrolidinyl)northebaine is thereby obtained.

EXAMPLE 13

*Preparation of 6-demethoxy-6-piperidinothebaine*

By following the procedure of Example 5 except that an equivalent amount of piperidine is used in place of the morpholine of that example, there is obtained 6-demethoxy-6-piperidinothebaine.

EXAMPLE 14

*Preparation of 6-demethoxy-6-dimethylaminothebaine*

By following the procedure of Example 5 except that an equivalent amount of dimethylamine is used in place of the morpholine of that example, there is obtained 6-demethoxy-6-dimethylaminothebaine.

EXAMPLE 15

*Preparation of 7-cyano-7,8-dihydro-6-(1-pyrrolidinyl)-6,14-endoethenocodide*

6,8-bis-(1-pyrrolidinyl)-Δ$^6$-codide methanolate (200 mg) and acrylonitrile (5 ml.) are heated under reflux for two hours. The solvent is then evaporated and the residue is crystallized from acetone-n-hexane to give 7-cyano-7,8-dihydro-6-(1-pyrrolidinyl)-6,14 - endoethenocodide (125 mg.), M.P. 197–200° C. dec. This product is a mixture of epimers, as indicated by the nuclear magnetic resonance spectrum. By partition chromatography this mixture is separated, giving the C–7 endo (α)- and exo (β)-isomers in substantially pure form. These purified isomers melt at 201–202° C. dec. and 205–207° C. dec., respectively.

EXAMPLE 16

*Preparation of 7-cyano-7,8-dihydro-6-(1-pyrrolidinyl)-6,14-endoethenocodide*

6-demethoxy-6-(1-pyrrolidinyl)thebaine (ca. 80 mg. obtained as oil by the procedure of Example 2 and used without further purification) and acrylonitrile (5 ml.) are heated under reflux for two hours. The solvent is then evaporated and the residue is crystallized from acetone-n-hexane to give 7-cyano-1,8-dihydro-6-(1-pyrrolidinyl)-6,14-endoethenocodide (64 mg.), M.P. 195–199° C. dec., as a mixture of C–7 epimers.

EXAMPLE 17

*Preparation of 7-formyl-7,8-dihydro-6-(1-pyrrolidinyl)-6,14-endoethenocodide*

Acrolein (0.15 ml.) is added to a solution of 6,8-bis-(1-pyrrolidinyl)-Δ$^6$-codide methanolate (100 mg.) in anhydrous benzene (4 ml.) and the reaction mixture is heated under reflux for two hours. The resulting solution is evaporated under reduced pressure, and the residue is collected with n-hexane to give crude product (53 mg., 46%), M.P. 150–155° C. Recrystallization from acetone-n-hexane gives purified 7α-formyl-7,8-dihydro-6-(1-pyrrolidinyl)-6,14-endoethenocodide, which melts at 165–167° C.

EXAMPLE 18

*Preparation of 7-formyl-7,8-dihydro-6-(1-pyrrolidinyl)-6,14-endoethenocodide*

A solution of acrolein (1 ml.) in anhydrous benzene (35 ml.) is added dropwise with stirring to a solution of 6-demethoxy-6-(1-pyrrolidinyl)thebaine (ca. 1.7 g.) in anhydrous benzene under nitrogen. The resulting solution is heated under reflux for one hour, the solvent is evaporated, and the residue is collected with n-hexane to give crude product (1.6 g., 90%), M.P. 155–158° C. Recrystallization from methylene chloride-n-hexane (with the aid of charcoal) gives purified 7α-formyl-7,8-dihydro-6-(1-pyrrolidinyl)-6,14-endoethenocodide, M.P. 165–167° C.

EXAMPLE 19

*Preparation of 7-carbethoxy-7,8-dihydro-6-(1-pyrrolidinyl)-6,14-endoethenocodide*

6,8-bis-(1-pyrrolidinyl)-Δ⁶-codide methanolate (200 mg.) and ethyl acrylate (5 ml.) are heated on the steambath for 2 hours. The solvent is then removed by evaporation, the residual gum is dissolved in n-hexane, and the solution is treated with charcoal and filtered. The residual gum, obtained by evaporation of the solvent, is dissolved in dilute hydrochloric acid (5 ml.; 5%) and the crude product (as the free base) is precipitated by the addition of aqueous sodium bicarbonate solution. The product is collected, washed with water, and dried. This base (160 mg.), melting point 57–60° C., in acetone (2 ml.) is treated with an excess of ethanolic hydrochloric acid (1.5 N). The hydrochloride starts to separate and ether is added to complete the separation. The hydrochloride is collected, washed with ether, and dried. Crystallization from methanol-acetone gives purified 7α-carbethoxy-7,8-dihydro-6-(1-pyrrolidinyl) - 6,14 - endoethenocodide hydrochloride (143 mg.), M.P. 219–221° C. dec.

EXAMPLE 20

*Preparation of 7-benzoyl-7,8-dihydro-6-(1-pyrrolidinyl)-6,14-endoethenocodide*

6,8-bis-(1-pyrrolidinyl)-Δ⁶-codide methanolate (1.5 g.) is heated under reflux in phenyl vinyl ketone (1.5 g.) and benzene (5 ml.) for 2 hours. The solvent is then removed by evaporation, and the residue is collected with the aid of methanol and crystallized from methylene chloride-acetone to give 7-benzoyl-7,8-dihydro-6-(1-pyrrolidinyl)-6,14-endoethenocodide (600 mg.), melting point 182–183° C. dec. This product is a mixture of isomers as indicated by the nuclear magnetic resonance spectrum. It contains isomeric compounds which are epimeric at C-7.

EXAMPLE 21

*Preparation of 7-acetyl-7,8-dihydro-6-(1-pyrrolidinyl)-6,14-endoethenocodide*

A mixture of 500 mg. of 6,8-bis-(1-pyrrolidinyl)-Δ⁶-codide methanolate and 5 ml. of methyl vinyl ketone is heated under reflux for about 20 hours. The reaction mixture is evaporated under reduced pressure, the residue is dissolved in methylene chloride, the solution is treated with charcoal, filtered and evaporated again. This residue is dissolved in 10 ml. of 5% HCl, and the solution is neutralized with aqueous sodium bicarbonate, whereupon the crude product (228 mg.) is precipitated, collected, and dried.

EXAMPLE 22

*Preparation of 7-acetyl-7,8-dihydro-6-(1-pyrrolidinyl)-6,14-endoethenocodide*

A solution of 6-demethoxy-6-(1-pyrrolidinyl)thebaine (1.7 g.) and methyl vinyl ketone (0.72 ml., 2 equivalents) in anhydrous benzene (100 ml.) is heated under reflux for 15 hours. The solvent is removed, and the resulting oil is dissolved in dilute hydrochloric acid (25 ml., 5%); the resulting solution is neutralized with aqueous sodium bicarbonate, and the white precipitate that forms is filtered and dried to give 7α-acetyl-7,8-dihydro-6-(1-pyrrolidinyl)-6,14-endoethenocodide (1.1 g.). When purified by crystallization from ether-n-hexane this product melts at 104–107° C.

EXAMPLE 23

*Preparation of 7-cyano-7,8-dihydro-6-morpholino-6,14-endoethenocodide*

A solution of 6-demethoxy-6-morpholinothebaine (300 mg.) in acrylonitrile (5 ml.) is heated under reflux for three hours. Evaporation with the aid of benzene gives an oil which is dissolved in dilute hydrochloric acid (3 ml., 5%). Neutralization with aqueous sodium bicarbonate yields a solid which is filtered off and dried giving 7-cyano - 7,8 - dihydro - 6 - morpholino - 6,14 - endoethenocodide (74 mg.) as a mixture of 7α- and 7β-epimers (as indicated by the nuclear magnetic resonance spectrum).

EXAMPLE 24

*Preparation of 7-carbethoxy-7,8-dihydro-6-morpholino-6,14-endoethenocodide*

A solution of 6-demethoxy-6-morpholinoethebaine (300 mg.) in ethyl acrylate (5 ml.) is heated on the steam bath for three hours. Evaporation with the aid of benzene gives an oil which is dissolved in dilute hydrochloric acid (3 ml., 5%). Neutralization with aqueous sodium bicarbonate yields a solid which is filtered off and dried giving crude 7α-carbethoxy - 7,8 - dihydro-6-morpholino-6,14-endoethenocodide as an amorphous solid (80 mg.).

EXAMPLE 25

*Preparation of 7-carbamyl-7,8-dihydro-6-(1-pyrrolidinyl)-6,14-endoethenocodide*

The general procedure of Example 16 is repeated. 6-demethoxy-6-(1-pyrrolidinyl)thebaine is heated with an excess of acrylamide at about 85° C., the product is isolated, and 7-carbamyl-7,8-dihydro-6-(1-pyrrolidinyl)-6,14-endoethenocodide is thereby obtained.

EXAMPLE 26

*Preparation of 7-cyclohexanecarbonyl-7,8-dihydro-6-(1-pyrrolidinyl)-6,14-endoethenocodide*

The general procedure of Example 18 is repeated. 6-demethoxy-6-(1-pyrrolidinyl)thebaine is heated with cyclohexyl vinyl ketone in anhydrous benzene, the product is isolated, and 7-cyclohexanecarbonyl-7,8-dihydro-6-(1-pyrrolidinyl)-6,14-endoethenocodide is thereby obtained.

EXAMPLE 27

*Preparation of 7-dimethylcarbamyl-7,8-dihydro-6-(1-pyrrolidinyl)-6,14-endoethenocodide*

The general procedure of Example 18 is repeated. 6-demethoxy-6-(1-pyrrolidinyl)thebaine is heated with N,N-dimethylacrylamide in anhydrous benzene, the product is isolated, and 7-dimethylcarbamyl-7,8-dihydro-6-(1-pyrrolidinyl)-6,14-endoethenocodide is thereby obtained.

EXAMPLE 28

*Preparation of 7,8-dihydro-7-propionyl - 6 - (1 - pyrrolidinyl)-6,14-endoethenocodide*

The general procedure of Example 18 is repeated. 6-demethoxy-6-(1-pyrrolidinyl)thebaine is heated with ethyl vinyl ketone in anhydrous benzene, the product is isolated, and 7,8-dihydro-7-propionyl - 6 - (1 - pyrrolidinyl)-6,14-endoethenocodide is thereby obtained.

EXAMPLE 29

*Preparation of 7-carbobenzyloxy-7,8-dihydro-6-(1-pyrrolidinyl)6,14-endoethenocodide*

The general procedure of Example 18 is repeated. 6-demethoxy-6-(1-pyrrolidinyl)thebaine is heated with benzyl acrylate in anhydrous benzene, the product is isolated, and 7-carbobenzyloxy-7,8-dihydro-6-(1-pyrrolidinyl)-6,14-endoethenocodide is thereby obtained.

EXAMPLE 30

*Preparation of 7-cyano-7,8-dihydro-6-(1-pyrrolidinyl)-6,14-endoethenomorphide*

The general procedure of Example 16 is repeated. 6-demethoxy-6-(1-pyrrolidinyl)oripavine is heated with an excess of acrylonitrile, the product is isolated, and 7-cyano-7,8-dihydro-6-(1-pyrrolidinyl) - 6,14 - endoethenomorphide is thereby obtained.

EXAMPLE 31

*Preparation of 7-formyl-7,8-dihydro-6-(1-pyrrolidinyl)-6,14-endoethenomorphide*

The general procedure of Example 18 is repeated. 6-demethoxy-6-(1-pyrrolidinyl)oripavine in heated with acrolein in anhydrous benzene, the product is isolated, and 7-formyl-7,8-dihydro - 6 - (1 - pyrrolidinyl) - 6,14-endoethenomorphide is thereby obtained.

EXAMPLE 32

*Preparation of 7-carbethoxy-7,8-dihydro-6-(1-pyrrolidinyl)-6,14-endoethenomorphide*

The general procedure of Example 16 is repeated. 6-demethoxy-6-(1-pyrrolidinyl)oripavine is heated with an excess of ethyl acrylate, the product is isolated, and 7 - carbethoxy - 7,8 - dihydro - 6 - (1 - pyrrolidinyl)-6,14-endoethenomorphide is thereby obtained.

EXAMPLE 33

*Preparation of 7-benzoyl-7,8-dihydro-6-(1-pyrrolidinyl)-6,14-endoethenomorphide*

The general procedure of Example 18 is repeated. 6-demethoxy-6-(1-pyrrolidinyl)oripavine is heated with phenyl vinyl ketone in anhydrous benzene, the product is isolated, and 7-benzoyl-7,8-dihydro-6-(1-pyrrolidinyl)-6,14-endoethenomorphide is thereby obtained.

EXAMPLE 34

*Preparation of 7-acetyl-7,8-dihydro-6-(1-pyrrolidinyl)-6,14-endoethenomorphide*

The general procedure of Example 18 is repeated. 6-demethoxy-6-(1-pyrrolidinyl)oripavine is heated with an excess of methyl vinyl ketone in anhydrous benzene, the product is isolated, and 7-acetyl-7,8-dihydro-6-(1-pyrrolidinyl)-6,14-endoethenomorphide is thereby obtained.

EXAMPLE 35

*Preparation of 7-acetyl-N-allyl-7,8-dihydro-6-(1-pyrrolidinyl)-6,14-endoethenonorcodide*

The general procedure of Example 16 is repeated. N-allyl - 6 - demethoxy - 6 - (1 - pyrrolidinyl)northebaine is heated with an excess of methyl vinyl ketone in anhydrous benzene, the product is isolated, and 7-acetyl-N-allyl-7,8-dihydro-6 - (1 - pyrrolidinyl) - 6,14 - endoethenonorcodide is thereby obtained.

EXAMPLE 36

*Preparation of 7-acetyl-N-cyclopropylmethyl-7,8-dihydro-6-(1-pyrrolidinyl)-6,14-endoethenonorcodide*

The general procedure of Example 18 is repeated. N-cyclopropylmethyl - 6 - demethoxy - 6 - (1 - pyrrolidinyl)-northebaine is heated with an excess of methyl vinyl ketone in anhydrous benzene, the product is isolated, and 7 - acetyl - N - cyclopropylmethyl - 7,8 - dihydro - 6 - (1-pyrrolidinyl)-6,14-endoethenonorcodide is thereby obtained.

EXAMPLE 37

*Preparation of 7-cyano-N-phenethyl-7,8-dihydro-6-(1-pyrrolidinyl)-6,14-endoethenonorcodide*

The general procedure of Example 16 is repeated. 6-demethoxy - N - phenethyl - 6 - (1 - pyrrolidinyl)northebaine is heated with an excess of acrylonitrile, the product is isolated, and 7-cyano-N-phenethyl-7,8-dihydro-6-(1-pyrrolidinyl)-6,14-endoethenonorcodide is thereby obtained.

EXAMPLE 38

*Preparation of 7-carbethoxy-N-cyclopropylmethyl-7,8-dihydro-6-(1-pyrrolidinyl)-6,14-endoethenonormorphide*

The general procedure of Example 16 is repeated. N-cyclopropylmethyl - 6 - demethoxy - 6 - (1 - pyrrolidinyl)-nororipavine is heated with an excess of ethyl acrylate, the product is isolated, and 7-carbethoxy-N-cyclopropylmethyl - 7,8 - dihydro - 6 - (1 - pyrrolidinyl) - 6,14 - endoethenonormorphide is thereby obtained.

EXAMPLE 39

*Preparation of 3,7-diacetyl-N-cyclopropylmethyl-7,8-dihydro-6-(1-pyrrolidinyl)-6,14endoethenonormorphide*

The general procedure of Example 18 is repeated. 3-acetyl - N - cyclopropylmethyl - 6 - demethoxy - 6 - (1-pyrrolidinyl)-nororipavine is heated with an excess of methyl vinyl ketone in anhydrous benzene, the product is isolated, and 3,7-diacetyl-N-cyclopropylmethyl-7,8-dihydro-6-(1-pyrrolidinyl)-6,14-endoethenonormorphide is thereby obtained.

EXAMPLE 40

*Preparation of 7-acetyl-N-cyano-7,8-dihydro-6-(1-pyrrolidinyl)-6,14-endoethenonorcodide*

The general procedure of Example 18 is repeated. N-cyano-6-demethoxy-6-(1 - pyrrolidinyl)northebaine is heated with an excess of methyl vinyl ketone in anhydrous benzene, the product is isolated, and 7-acetyl-N-cyano-7,8-dihydro-6-(1-pyrrolidinyl) - 6,14 - endoethenonorcodide is thereby obtained.

EXAMPLE 41

*Preparation of 7-carbethoxy-7,8-dihydro-6-piperidino-6,14-endoethenocodide*

The general procedure of Example 24 is repeated. 6-demethoxy-6-piperidinothebaine is heated with an excess of ethyl acrylate, the product is isolated, and 7-carbethoxy-7,8-dihydro-6-piperidino - 6,14 - endoethenocodide is thereby obtained.

EXAMPLE 42

*Preparation of 7-carbethoxy-7,8-dihydro-6-dimethylamino-6,14-endoethenocodide*

The general procedure of Example 24 is repeated. 6-demethoxy-6-dimethylaminothebaine is heated with an excess of ethyl acrylate, the product is isolated, and 7-carbethoxy - 7,8 - dihydro-6-dimethylamino-6,14-endoethenocodide is thereby obtained.

What is claimed is:
1. A compound selected from the group consisting of those of the formula:

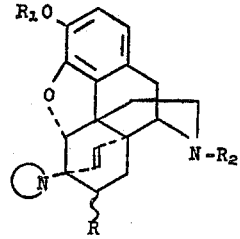

wherein $R_1$ is selected from the group consisting of hydrogen, lower alkyl and lower alkanoyl, $R_2$ is selected from the group consisting of hydrogen, cyano, propargyl, lower alkyl, phenyl lower alkyl, lower alkenyl and lower cycloalkylmethyl, R is selected from the group consisting of cyano, formyl, carbamyl, mono(lower alkyl) carbamyl, di(lower alkyl)carbamyl, lower alkanoyl, lower cycloalkanoyl, benzoyl, lower carboalkoxy and carbo- (phenyl lower alkyl)oxy, and ⟩N— is selected from the group consisting of pyrrolidinyl, piperidino, morpholino and di(lower alkyl)amino; the non-toxic pharmaceutically acceptable acid-addition salts thereof; and the alkali metal phenolates thereof when $R_1$ is hydrogen.

2. A compound according to claim 1 in which $R_1$ is methyl, $R_2$ is methyl, R is cyano and ⟩N— is 1-pyrrolidinyl.

3. A compound according to claim 1 in which $R_1$ is methyl, $R_2$ is methyl, R is formyl and ⟩N— is 1-pyrrolidinyl.

4. A compound according to claim 1 in which $R_1$ is methyl, $R_2$ is methyl, R is carbethoxy and ⟩N— is 1-pyrrolidinyl.

5. A compound according to claim 1 in which $R_1$ is methyl, $R_2$ is methyl, R is benzoyl and ⟩N— is 1-pyrrolidinyl.

6. A compound according to claim 1 in which $R_1$ is methyl, $R_2$ is methyl, R is acetyl and ⟩N— is 1-pyrrolidinyl.

7. A compound according to claim 1 in which $R_1$ is methyl, $R_2$ is methyl, R is cyano and ⟩N— is morpholino.

8. A compound according to claim 1 in which $R_1$ is methyl, $R_2$ is methyl, R is carbethoxy and ⟩N— is morpholino.

9. A compound according to claim 1 in which $R_1$ is hydrogen, $R_2$ is cyclopropylmethyl, R is carbethoxy and ⟩N— is 1-pyrrolidinyl.

10. The method of preparing a compound of the formula of claim 1 which comprises contacting a compound of the formula:

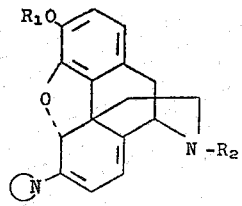

wherein $R_1$, $R_2$ and ⟩N— are as defined in claim 1, with a dienophile of the formula: $CH_2=CH-R$ wherein R is as defined in claim 1; in a solvent inert to the reactants at a temperature of from about 50° C. to about 150° C.

References Cited by the Examiner

FOREIGN PATENTS 902,659   8/1962   Great Britain.
969,263   5/1964   Great Britain.

OTHER REFERENCES

Bentley: "The Chemistry of Morphine Aklaloids," Oxford, (1954), p. 290 relied on.

Fieser, et al.: Adv. Organic Chemistry, Reinhold, 1951, pp. 498–499.

Janssen, J.: Am. Chem. Soc., vol. 78, (1956), p. 3862.

ALEX MAZEL, *Primary Examiner.*

DONALD G. DAUS, *Assistant Examiner.*